W. S. BANDY.
DRINKING FOUNTAIN FOR POULTRY.
APPLICATION FILED SEPT. 30, 1908.
926,538.
Patented June 29, 1909.
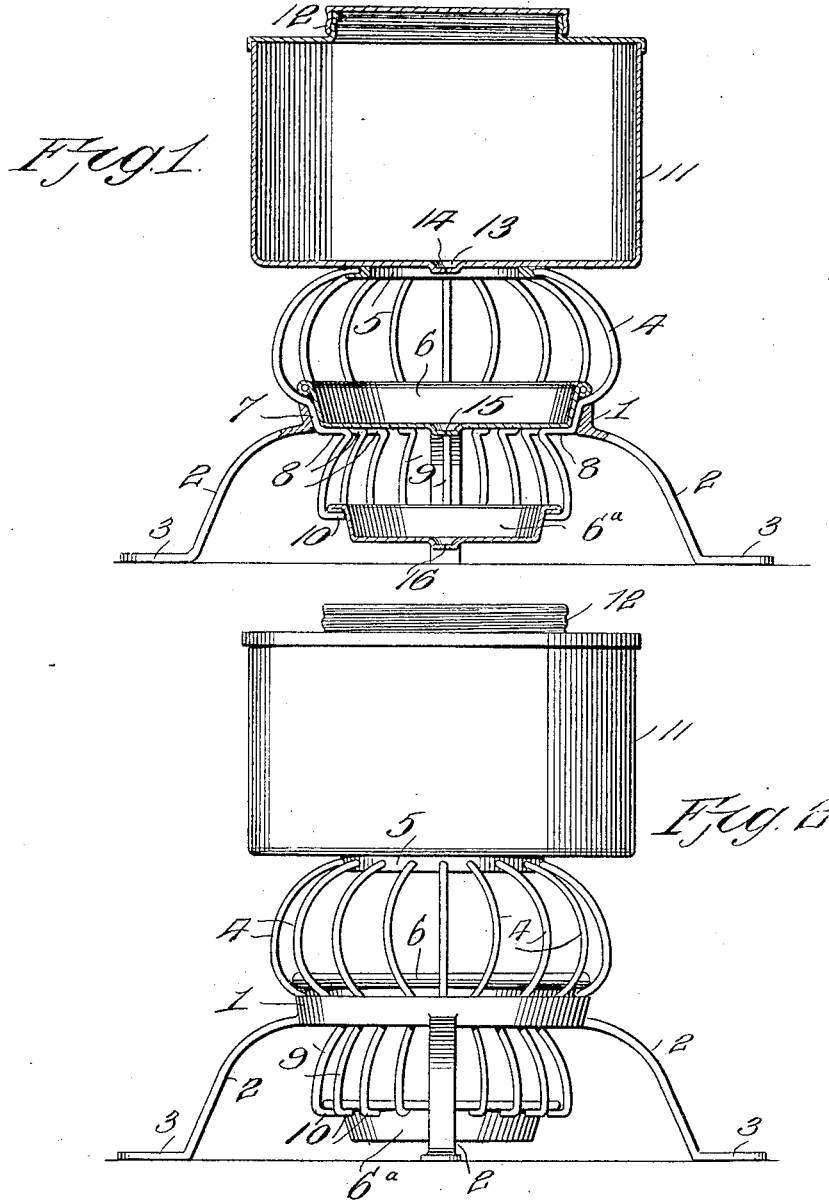

UNITED STATES PATENT OFFICE.

WELCOME S. BANDY, OF ANDREWS, INDIANA.

DRINKING-FOUNTAIN FOR POULTRY.

No. 926,538.   Specification of Letters Patent.   Patented June 29, 1909.

Application filed September 30, 1908. Serial No. 455,578.

*To all whom it may concern:*

Be it known that I, WELCOME S. BANDY, a citizen of the United States, residing at Andrews, in the county of Huntington and State of Indiana, have invented new and useful Improvements in Drinking-Fountains for Poultry, of which the following is a specification.

This invention relates to drinking fountains for poultry, and one of the principal objects of the same is to provide a self-feeding fountain in which provision is made for little chicks and for full grown birds.

Another object of the invention is to provide a fountain for poultry which will prevent the larger fowls from interfering with the small chicks while drinking.

Still another object of the invention is to provide a simple and efficient self-feeding double fountain for young and old poultry which can be manufactured at slight cost, which can be readily cleaned and which can be quickly supplied with fresh water.

These and other objects may be attained by means of the construction illustrated in the accompanying drawing, in which,—

Figure 1 is a central vertical section taken through the complete fountain. Fig. 2 is a side elevation of the same.

Referring to the drawing, the numeral 1 designates a stand comprising a ring mounted on legs 2 and provided with suitable feet 3. The wire rack 4 is made up of a series of strands of wire connected at their upper ends to a ring 5 and from thence curved outward to form bars spaced apart a sufficient distance to permit the head of a full grown bird to reach the water in the pan or trough 6. The wire strands are provided with inclined members 7 and inwardly bent portions 8 which serve to support the pan or trough 6 and at the same time provide means whereby the rack may be supported upon the ring of the stand 1. From the shoulders 8 the wire bars are curved, as at 9, and their terminal ends bent inward, as at 10, to support the pan or trough 6$^a$ designed for use by the smaller birds. It is to be noted that the space between the portion 9 of the bars is somewhat less than the space between the bars above and also that the lower portion of the fountain is located under the stand, so that the chicks will not be interfered with by the older birds at the time of drinking.

Supported upon the top of the rack is a water container 11 closed at the top by a threaded cap 12 and having at the bottom a depression 13 in the bottom of which is a perforation 14. The pans or troughs 6$^a$ are each provided with depressions 15 and 16.

The operation of my invention may be briefly described as follows: Water is placed in the container 11, and the fountain is preferably disposed over a drain pipe driven into the ground so that the water which seeps through the fountain will not make the ground muddy around the fountain. The water drops through the perforation 14 into the pan 6, and from thence through the perforation 15 into the pan 6$^a$. The water from this pan drops through the perforation 16 into the drain pipe or on to the ground. It will be understood that the perforations in the water container and pans are of such size as will only permit a small quantity to seep through. The pans 6 and 6$^a$ may be originally supplied with water.

From the foregoing it will be obvious that a fountain made in accordance with my invention can be produced at comparatively low cost, can be readily cleaned, insures a fresh supply of water constantly for the small chicks and for the older birds, and that there is no interference with the smaller birds.

I claim:

1. A drinking fountain for poultry comprising a stand, a rack mounted on the stand, said rack comprising vertically disposed spaced bars provided with shoulders and inwardly bent lower ends, a plurality of pans, one of which is supported upon the shoulders in the rack and the other upon the inwardly bent ends, the bars of the rack being spaced wider apart for the upper pan than the lower one, and a water container supported upon the rack and provided with a perforated bottom.

2. A poultry fountain comprising a stand, a rack supported upon the stand, said rack comprising vertically spaced bars provided with shoulders intermediate their ends, a pan supported upon said shoulders, a water container supported upon the rack above the pan, a pan supported at the lower end of the rack, said water container and said pans each being provided with a single central perforation.

In testimony whereof I affix my signature in presence of two witnesses.

WELCOME S. BANDY.

Witnesses:
R. H. SNITZ,
O. K. GLEASON.